United States Patent
Gretz

(10) Patent No.: US 7,294,781 B1
(45) Date of Patent: Nov. 13, 2007

(54) RECESSED ELECTRICAL OUTLET ASSEMBLY

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 11/655,299

(22) Filed: Jan. 19, 2007

Related U.S. Application Data

(63) Continuation-in-part of application No. 11/356,590, filed on Feb. 16, 2006, now Pat. No. 7,166,801, which is a continuation-in-part of application No. 11/264,857, filed on Nov. 2, 2005, now Pat. No. 7,045,713, which is a continuation-in-part of application No. 11/246,985, filed on Oct. 7, 2005, now Pat. No. 7,064,271, which is a continuation-in-part of application No. 11/185,256, filed on Jul. 20, 2005, now Pat. No. 7,115,820, which is a continuation-in-part of application No. 11/102,392, filed on Apr. 8, 2005, now Pat. No. 7,151,219, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)

(52) U.S. Cl. ............. 174/53; 174/57; 174/58; 174/61; 220/3.2; 220/3.3; 248/906

(58) Field of Classification Search ............ 174/480, 174/481, 50, 53, 57, 58, 66, 67; 220/3.2, 220/3.3, 3.4, 3.5, 3.6, 3.7, 3.8, 3.9, 4.02, 220/241, 242; 248/906; 439/535, 536
See application file for complete search history.

(56) References Cited

U.S. PATENT DOCUMENTS

| 4,059,327 | A  |   | 11/1977 | Vann              |         |
|-----------|----|---|---------|-------------------|---------|
| 4,927,039 | A  | * | 5/1990  | McNab             | 174/57  |
| 4,936,794 | A  |   | 6/1990  | Shaw et al.       |         |
| 4,988,832 | A  | * | 1/1991  | Shotey            | 174/53  |
| 5,042,673 | A  | * | 8/1991  | McShane           | 174/57  |
| 5,117,996 | A  | * | 6/1992  | McShane           | 174/57  |
| 5,257,946 | A  |   | 11/1993 | MacMillan et al.  |         |
| 5,600,093 | A  | * | 2/1997  | Herth et al.      | 174/53  |
| 5,975,323 | A  | * | 11/1999 | Turan             | 220/3.7 |
| 6,369,322 | B1 | * | 4/2002  | Gretz             | 174/50  |
| 6,737,576 | B1 | * | 5/2004  | Dinh              | 174/50  |
| 6,875,937 | B1 |   | 4/2005  | Saviano           |         |
| 7,044,318 | B2 |   | 5/2006  | Gates, II         |         |

\* cited by examiner

*Primary Examiner*—Angel R. Estrada

(57) ABSTRACT

A recessed electrical outlet assembly for recessing a duplex receptacle or similar electrical device within a wall. The recessed electrical outlet assembly includes an electrical box and a frame member. The electrical box includes sidewalls and a back wall defining a cavity therein. The cavity is capable of receiving an electrical device therein. The frame member includes a laterally extending flange and a rearward-extending collar that is received within the sidewalls of the electrical box. Alignment tabs are provided on the sidewalls of the electrical box to enable easy alignment against a stud in either a new work or retrofit situation. Bosses provided on the outer sidewalls of the electrical box are angled away from the sidewalls and toward the front of the electrical box and include captive fasteners to simplify the installation of the recessed electrical outlet assembly to a wall.

15 Claims, 6 Drawing Sheets

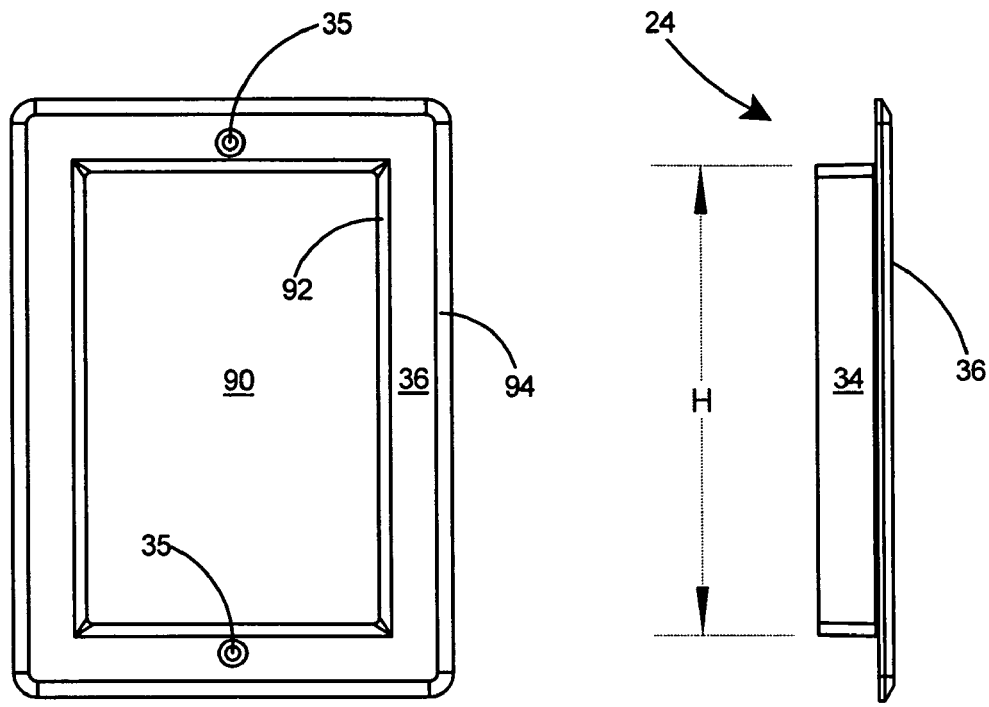
Fig. 6
Fig. 7
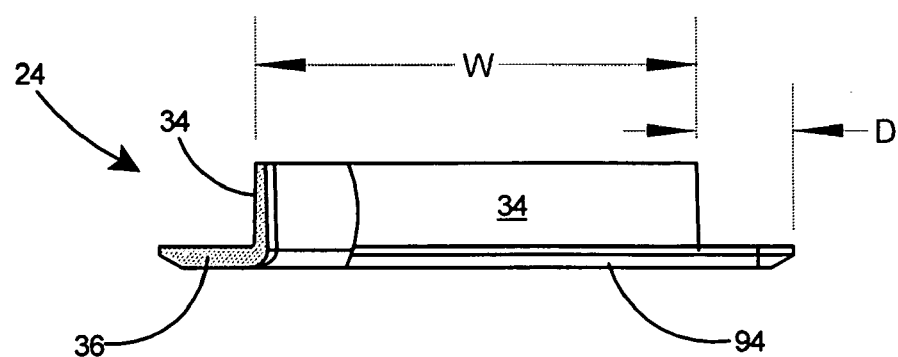
Fig. 8

RECESSED ELECTRICAL OUTLET ASSEMBLY

This application is a Continuation-In-Part of U.S. patent application Ser. No. 11/356,590 filed Feb. 16, 2006 now U.S. Pat. No. 7,166,801 and still pending, which is a Continuation-In-Part of U.S. patent application Ser. No. 11/264,857, filed Nov. 2, 2005 and now U.S. Pat. No. 7,045,713, which is a Continuation-In-Part of U.S. patent application Ser. No. 11/246,985, filed Oct. 7, 2005 and now U.S. Pat. No. 7,064,271, which is a Continuation-In-Part of U.S. patent application Ser. No. 11/185,256, filed Jul. 20, 2005 and now U.S. Pat. No. 7,115,820, which is a Continuation-In-Part of U.S. patent application Ser. No. 11/102,392, filed Apr. 8, 2005 and now U.S. Pat. No. 7,151,219, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171, all of which are commonly owned by the assignee of the present invention and the entire contents of which are incorporated herein by reference.

FIELD OF THE INVENTION

This invention relates to assemblies for the mounting of electrical devices and specifically to a recessed electrical outlet assembly that includes an electrical box portion and a frame member for recessing and protecting an electrical device therein.

BACKGROUND OF THE INVENTION

Recessed electrical boxes for retrofitting on finished walls or for use in new construction were disclosed in U.S. Pat. Nos. 6,965,078, 6,956,171, 7,005,578, 7,045,713, 7,064,271, 7,115,820, and 7,151,820 and in co-pending U.S. application Ser. No. 11/356,590, all of which are commonly owned by the assignee of the present invention and the entire contents of which are incorporated herein by reference.

The recessed electrical boxes disclosed in the aforementioned patents and applications comprised an electrical box having an inner enclosure for housing an electrical device and an outer enclosure for recessing the inner enclosure well within a wall. The recessed electrical box including the inner enclosure and outer enclosure were either integrally formed in one piece or provided in two pieces each formed of the same material of construction.

Although a recessed electrical box of the type described in the aforementioned disclosures provided an adequate means for recessing an electrical device substantially within the wall of a structure, they were directed primarily to recessing electrical devices on the exterior surface of a structure. Although the aforementioned patents and patent applications provide an apparatus for recessing an electrical box on the exterior of a structure, there is also a need for recessing an electrical outlet on an interior wall of a structure.

Accordingly, the present invention provides a two-piece recessed electrical outlet assembly that includes a first portion that comprises an electrical box for mounting in an interior wall and housing and protecting an electrical outlet and its associated wiring. A second portion of the recessed assembly includes a frame member for covering the electrical box and a portion of the interior wall surrounding the box to obscure that portion of the wall surrounding the electrical box.

SUMMARY OF THE INVENTION

The invention is a recessed electrical outlet assembly for recessing a duplex receptacle or similar electrical device within a wall. The recessed electrical outlet assembly includes an electrical box and a frame member. The electrical box includes sidewalls and a back wall defining a cavity therein. The cavity is capable of receiving an electrical device therein. The frame member includes a laterally extending flange and a rearward-extending collar that is received within the sidewalls of the electrical box. Alignment tabs are provided on the sidewalls of the electrical box to enable easy alignment against a stud in either a new work or retrofit situation. Bosses provided on the outer sidewalls of the electrical box are angled away from the sidewalls and toward the front of the electrical box and include captive fasteners to simplify the installation of the recessed electrical outlet assembly to a wall.

OBJECTS AND ADVANTAGES

A first object of the recessed electrical outlet assembly of the present invention is to provide an electrical box that positions an electrical device behind the wall surface, thereby recessing the electrical device and enabling cabinets, wall clocks, appliances, and the like to be positioned close to the wall without interference or obstruction from the electrical device.

A second object is to provide a recessed electrical outlet assembly that shields the electrical device and any electrical cords plugged therein from splashing water, grease, or other household hazards.

A further object is to provide a recessed electrical outlet assembly that provides a recessed area within the wall to hold the plug ends of electrical cords while they are in use, thereby recessing the plug ends away from the wall and from interference with the device they are providing electrical feed to.

Another object of the present invention is to provide a two-piece recessed electrical outlet assembly that includes bosses with captive fasteners for easing the installation task.

A further object of the present invention is to provide a two-piece recessed electrical outlet assembly in which the captive fasteners are angled outwards with respect to the sidewalls of the box and angled toward the front of the box to make them more easily accessible to an installer in a retrofit situation.

These and other objects and advantages of the present invention will be better understood by reading the following description along with reference to the drawings.

DESCRIPTION OF THE DRAWINGS

FIG. 6 is a front view of a frame member that forms a portion of the recessed electrical outlet assembly of FIG. 1.

FIG. 7 is a side view of the frame member as viewed from the left side of FIG. 5.

FIG. 8 is an end view of the electrical box as viewed from the bottom end of FIG. 5 and with a portion of the frame member cut away to show a sectional view of a collar portion.

TABLE OF NOMENCLATURE

Figure 1:
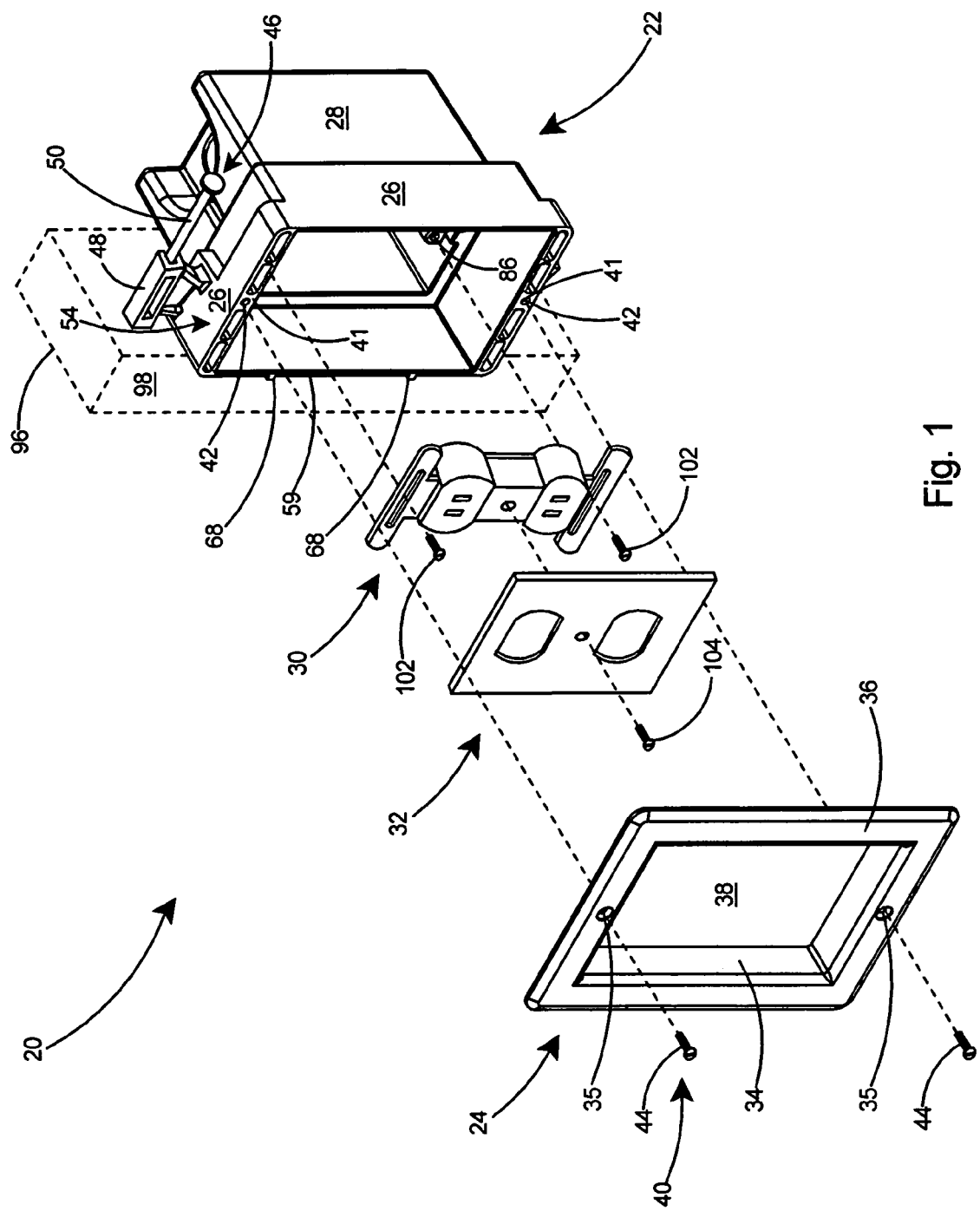
FIG. 1 is an exploded perspective view of a preferred embodiment of the recessed electrical outlet assembly according to the present invention along with a duplex outlet and its complementary faceplate.

The following is a listing of part numbers used in the drawings along with a brief description:

| Part Number | Description |
| --- | --- |
| 20 | recessed electrical outlet assembly |
| 22 | electrical box |
| 24 | frame member |
| 26 | front sidewall portion |
| 28 | rear sidewall portion |
| 30 | duplex receptacle |
| 32 | faceplate |
| 34 | peripheral sidewall of frame member |
| 35 | aperture in flange |
| 36 | flange |
| 38 | open rear end |
| 40 | fastening arrangement |
| 41 | boss in front sidewall of electrical box |
| 42 | bore |
| 44 | fastener |
| 46 | mounting arrangement |
| 48 | boss |
| 50 | captive fastener |
| 52 | axis |
| 54 | outer surface of front sidewalls |
| 56 | leg |
| 58 | head of fastener |
| 59 | front edge of front sidewall portion |
| 60 | rear edge of front sidewall portion |
| 62 | lateral wall |
| 64 | rear edge |
| 66 | rear wall |
| 68 | alignment tab |
| 70 | rear edge of alignment tab |
| 72 | outer surface of rear sidewalls |
| 74 | rib |
| 76 | axis |
| 78 | recessed area |
| 80 | recessed peripheral wall |
| 81 | knockout |
| 82 | front face |
| 84 | arrangement for securing an electrical device |
| 86 | device mounting boss |
| 88 | front face of boss |
| 90 | central opening of frame member |
| 92 | inner chamfered edge |
| 94 | outer chamfered edge |
| 96 | stud |

-continued

| Part Number | Description |
| --- | --- |
| 98 | front face of stud |
| 102 | fastener for electrical device |
| 104 | fastener for faceplate |
| 106 | sheetrock |
| 108 | plug end of electrical cord |
| 110 | push-in connector |
| D | distance flange extends outward from peripheral sidewall |
| W | outer width across peripheral wall of frame member |
| H | outer height across peripheral wall of frame member |
| W1 | inner width across front sidewalls of electrical box |
| H1 | inner height across front sidewalls of electrical box |
| θ | angle of fastener with respect to outer surface of sidewall |
| $θ_1$ | angle of fastener with respect to front edge of sidewall |

DETAILED DESCRIPTION OF THE INVENTION

With reference to FIG. 1, a preferred embodiment is shown of the present invention, which is a recessed electrical outlet assembly 20 including an electrical box 22 and a frame member 24. The electrical box 22 includes a front sidewall portion 26 and a rear sidewall portion 28, with the front sidewall portion 26 being of larger width and height than the rear sidewall portion 28. In FIG. 1, a duplex receptacle 30 and a faceplate 32 are shown in alignment with the electrical box 22. The frame member 24 includes a peripheral sidewall 34 and a lateral flange 36 with the peripheral sidewall 34 terminating in an open rear end 38. A fastening arrangement 40 for securing the frame member 24 to the electrical box 22 includes apertures 35 in the flange 36 of the frame member 24, a boss 41 including a bore 42 therein in the front sidewall 26 of the electrical box 22, and a fastener 44 for securing through the apertures 35 of the frame member 24 into the bore 42 of the electrical box 22.

Figure 2:
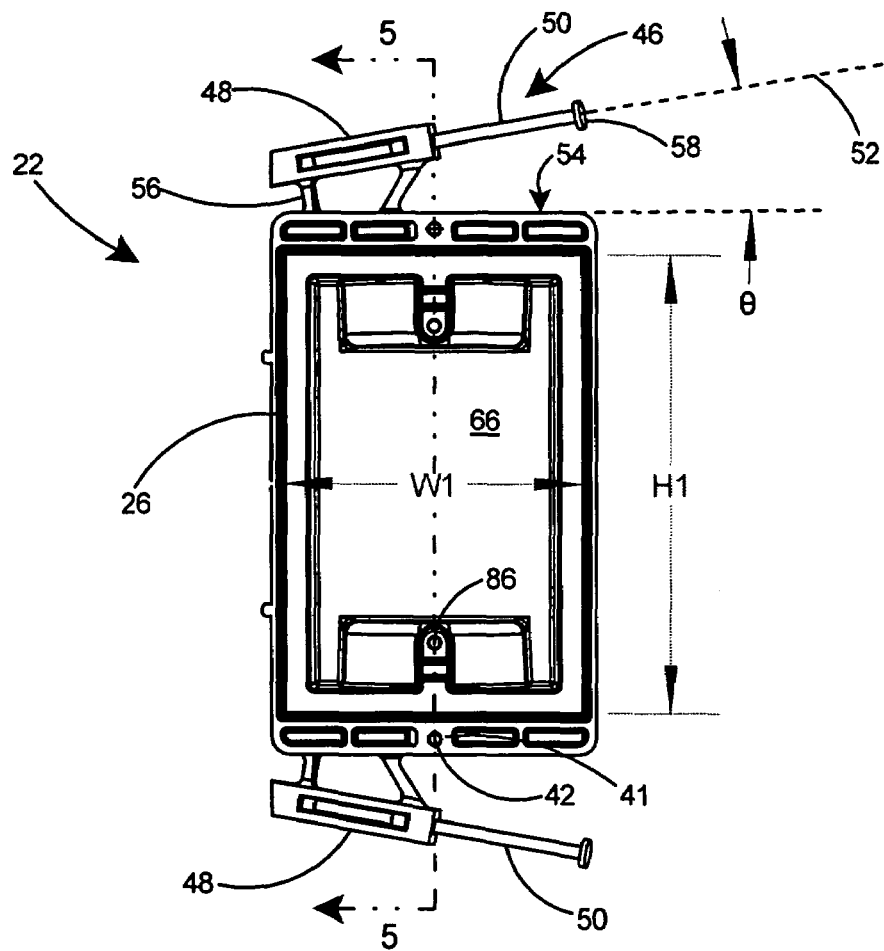
FIG. 2 is a front view of the electrical box portion of the recessed electrical outlet assembly of FIG. 1.

As shown in FIG. 2, the electrical box portion 22 of the recessed electrical outlet assembly includes a mounting arrangement 46 for securing the electrical box to a stud (not shown). The mounting arrangement 46 includes bosses 48 integral with the front sidewall 26 of the electrical box 22 and a captive fastener 50 held frictionally within each of the bosses 48. As shown by axis 52, the axial orientation angles each captive fastener 50 away from the outer surface 54 of the front sidewall 26 by angle θ. Integral legs 56 offset each boss 48 from the outer surface 54 of front sidewall 26 and the axial orientation directs the head 58 of the captive fastener 50 away from the front sidewall 26 to render the captive fastener 50 easily reachable by an installer.

Figure 3:
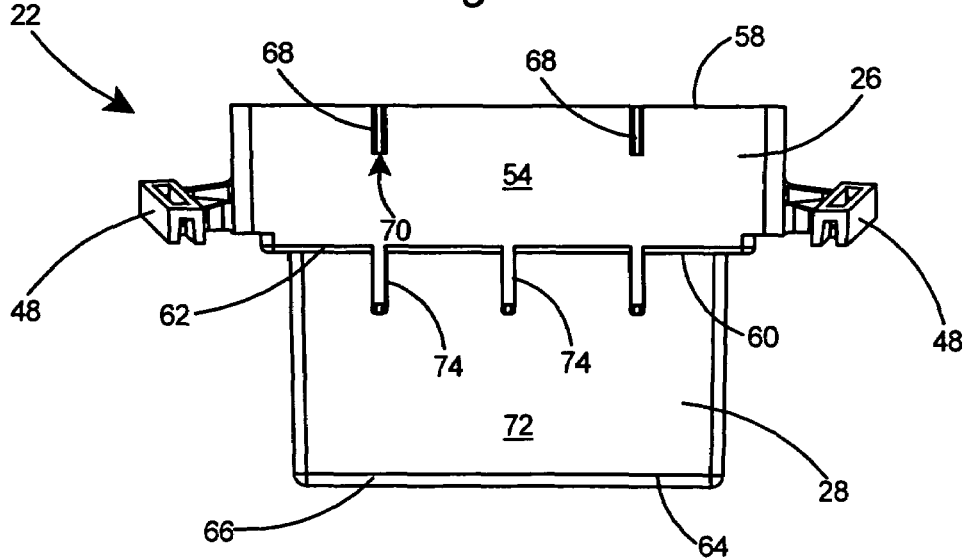
FIG. 3 is a side view of the electrical box as viewed from the left side of FIG. 2.

Referring to FIG. 3, the front sidewalls 26 of the electrical box 22 include a front edge 59 and a rear edge 60. A lateral wall 62 extends inward from the rear edge 60 of the front sidewalls 26. The rear sidewalls 28 extending rearward from the lateral wall 62 to a rear edge 64 and a rear wall 66 extends from the rear edge 60 thereby closing the rear end of the electrical box 22.

As shown in FIG. 3, the electrical box 22 includes one or more alignment tabs 68 extending along the outer surface 54 of the front sidewalls 26. The alignment tabs 68 extend rearward from the front edge 59 of the electrical box 22. The alignment tabs 68 include rear edges 70 which are planar with the front edge 59 of the electrical box 22. The rear sidewalls 28 include an outer surface 72 and one or more ribs 74 extending along the outer surface 72. The ribs 74 extend rearward from the lateral wall 62 of the electrical box 22.

Figure 4:
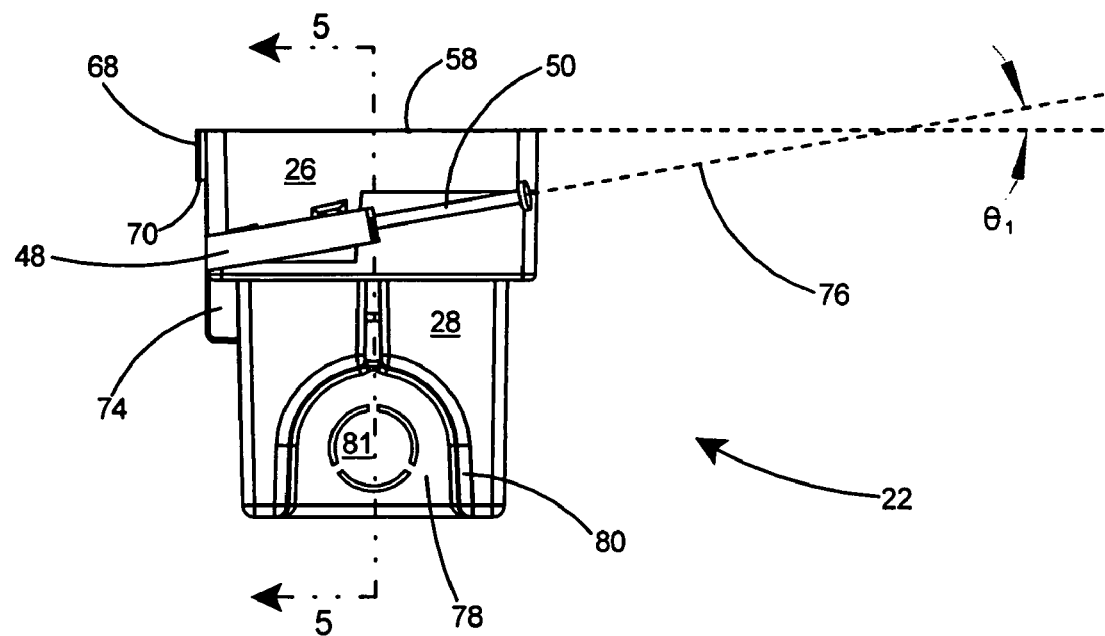
FIG. 4 is an end view of the electrical box as viewed from the bottom end of FIG. 2.

With reference to FIG. 4, as shown by axis 76, the captive fasteners 50 are at an angle $\theta_1$ of between 5 and 15 degrees with respect to the front edge 59 of the electrical box 22. The ribs 74 extend along the rear sidewall portion 28 and provide an extended surface area for fitting flush against a stud (not shown) that the electrical box 22 will later be secured to. As shown in FIG. 4, the rear sidewalls 28 of the electrical box 22 include one or more recessed areas 78 therein, with each recessed area 78 including a recessed peripheral wall 80 therein. The recessed area 78 includes a knockout 81 or removable wall portion, which can be removed to allow insertion of an electrical fitting therein or passage of electrical cables (not shown) to the electrical box.

Figure 5:
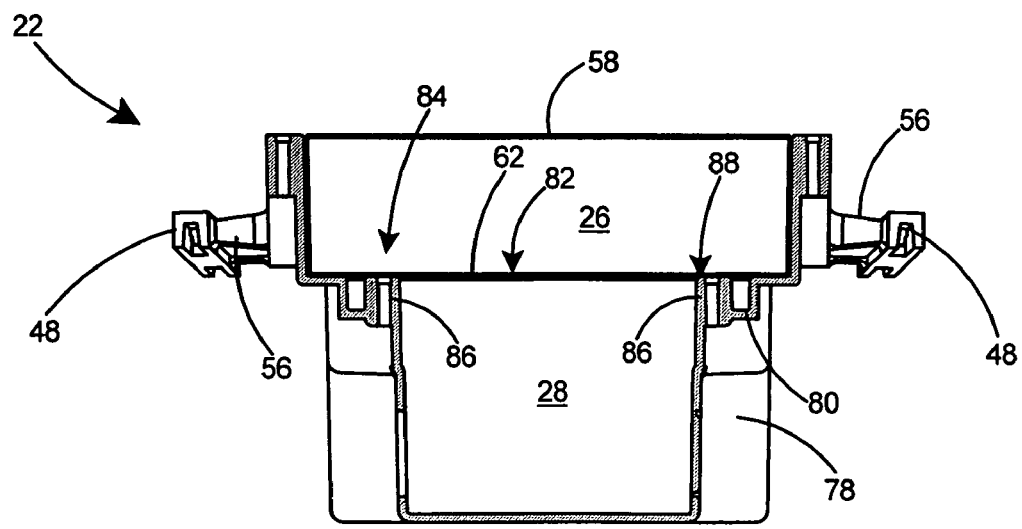
FIG. 5 is a sectional view of the electrical box taken along line 5-5 of FIG. 4.

With reference to FIG. 5, the lateral wall 62 of the electrical box 22 includes a front face 82 and an arrangement 84 for securing an electrical device (not shown) to the electrical box 22 such that it is mounted planar with the front face 82 of the lateral wall 62. The arrangement 84 for securing an electrical device includes device mounting bosses 86 molded integrally within the electrical box 22. The device mounting bosses 86 terminate in a front face 88 that is planar with the front face 82 of the lateral wall 62.

Figure 9:
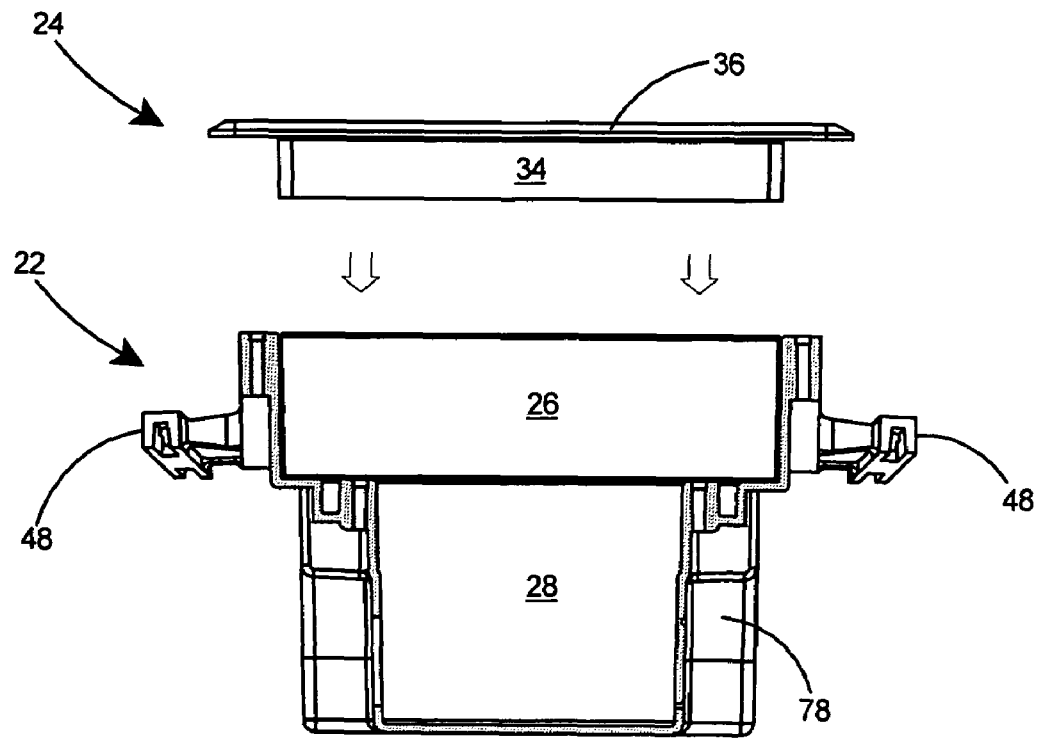
FIG. 9 is an exploded side view of the frame member portion in alignment with a sectional side view of the electrical box portion to which it will be secured to form a recessed electrical outlet assembly according to the present invention.
Figure 10:
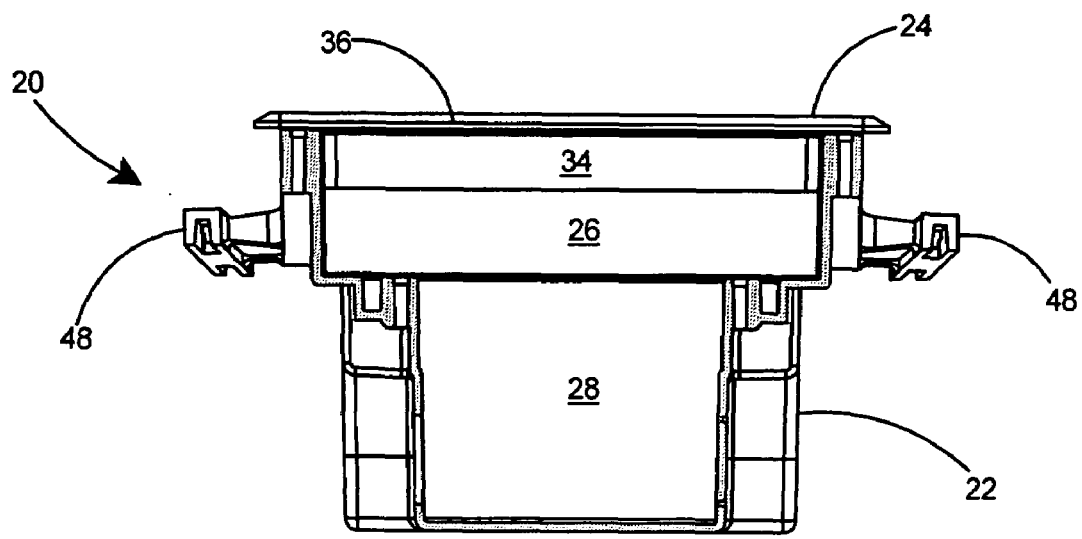
FIG. 10 is the side view of FIG. 9 but with the frame member secured to the electrical box to form the recessed electrical outlet assembly of the present invention.

Referring to FIGS. 6-8, the flange 36 of the frame member 24 extends outward from the peripheral sidewall 34 of the frame member 24 by a distance D of at least 0.5 inch. The frame member 24 includes a central opening 90, an inner chamfered edge 92 at the juncture of the peripheral sidewall 34 and the flange 36, and an outer chamfered edge 94 around the outer periphery of the flange 36. The outer width W across the peripheral sidewall 34 of the frame member 24, as shown in FIG. 8, and the outer height H across the peripheral sidewall 34 of the frame member 24, as shown in FIG. 7, are slightly smaller than the inner width W1 and inner height H1 (see FIG. 2) of the front sidewall portion 26 of the electrical box 22 to enable the peripheral sidewall 34 of the frame member 24 to be telescopically received within the front sidewall portion 26 of the electrical box 22, as shown in FIGS. 9 and 10.

Figure 11:
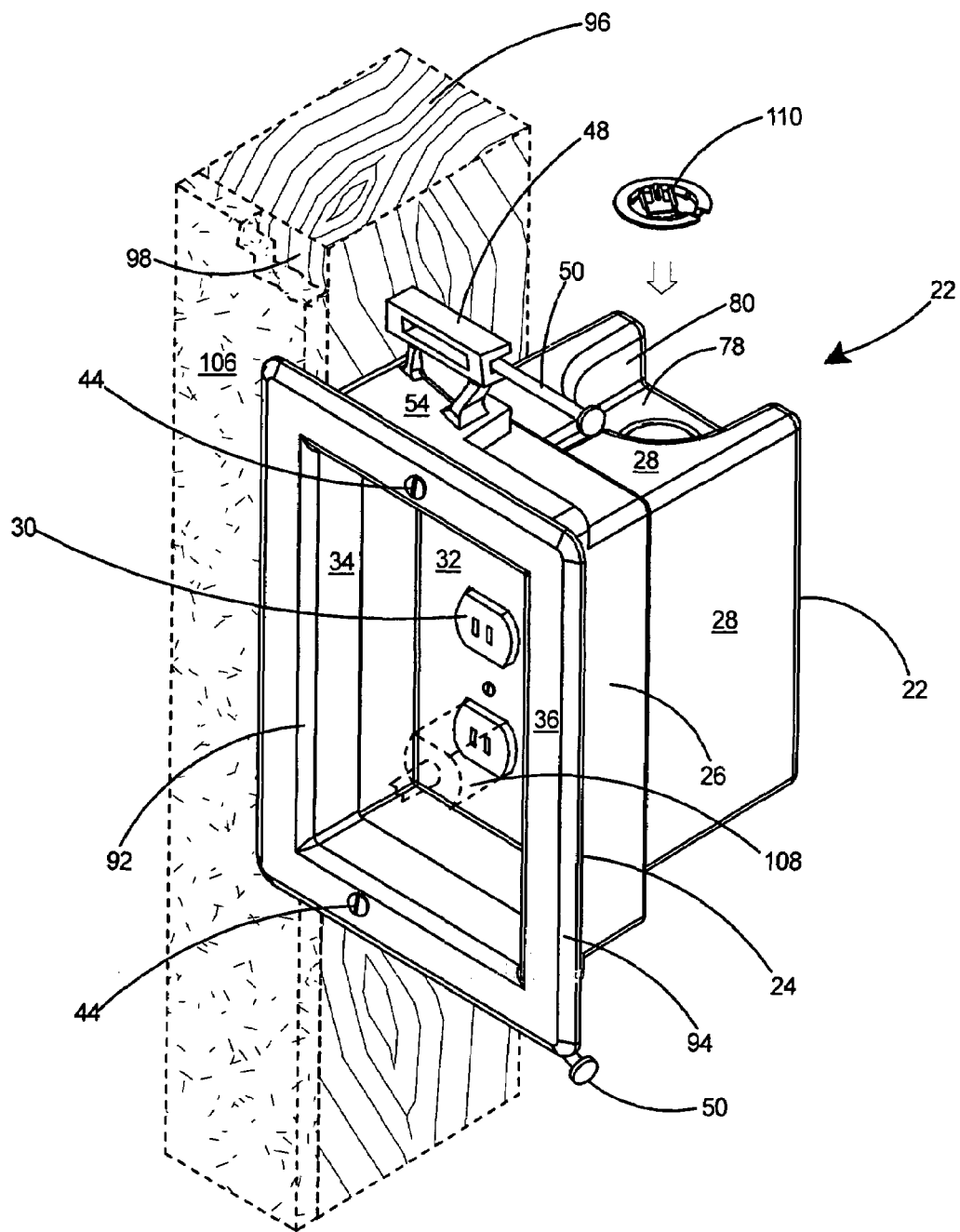
FIG. 11 is a perspective view of the recessed electrical outlet assembly of the present invention secured to a wall stud and with a duplex outlet and its complementary faceplate installed therein.

Reference is made to FIGS. 1 and 11 for an understanding of the operation of the recessed electrical outlet assembly 20 of the present invention. The recessed electrical outlet assembly 20 is used for recessing an electrical device, such as a duplex receptacle, within the wall of a structure. In certain locations, such as behind a cabinet which requires a wall outlet for illuminating a light, it would be advantageous to recess the electrical outlet so that the plug ends of the electrical cord at the outlet does not interfere with placing the cabinet against the wall. The description for operation of the recessed electrical outlet assembly presented herein is for interior use in new construction, in which the wall studs are exposed and prior to securing sheet rock to the wall. As shown in FIG. 1, the electrical box 22 is placed against a wall stud 96 and aligned with the front face 98 of the stud by sliding the box 22 backwards until the rear edge 70 of the alignment tabs 68 (see FIG. 4) are flush against the front face 98 of the stud 96. The alignment tabs 68 align the front edge 59 of the electrical box 0.5 inch from the face 98 of the stud 96, which is the proper distance to align the front edge 59 of the box 22 with the eventual surface of the wall for conventional ½ inch thick sheetrock.

With reference to FIG. 11, after the box 22 is aligned properly with the stud 96 by the alignment tabs 68, the captive fasteners 50 within the bosses 48 of the mounting arrangement 46 are driven into the wall stud 96 thereby securing the electrical box 22 to the stud 96. The captive fasteners 50 are easily accessible by the installer as a result of their offset from the outer surface 54 of the front sidewall 26 and the axial orientation of the captive fasteners 50 with the head of the fastener 50 oriented toward the front of the electrical box 22 and outward from the front sidewall 26.

After the electrical box 22 is secured to the wall stud 96, see FIG. 1, an electrical device such as the duplex receptacle 30 shown in FIG. 1 can be secured to the electrical box 22 by fasteners 102 secured into the device mounting bosses 86 within the box 22. A faceplate 32 can then be secured to the duplex receptacle 30 by a fastener 104 as shown in FIG. 1. Frame member 24 is then secured to the electrical box 22 by driving the fasteners 44 of the fastening arrangement 40 through the apertures 35 in the flange 36 of the frame member 24 and into the bores 42 that are integral with the front sidewalls 26 of the electrical box 22.

With reference to FIG. 11, after the frame member 24 is secured to the electrical box 22, flange 36 of the frame member 24 is secured flush against the front edge 59 of the electrical box 22 and also flush with the wall or outer face of the sheetrock 106. After the sheetrock 106 is installed, the recessed electrical outlet assembly 20 provides an electrical device 30 that is recessed a substantial distance from the face of the wall, thereby providing plenty of space to accommodate the plug ends 108 of electrical cords and thus preventing them from interfering with placement of the cabinet, electrical appliance, or similar object.

Although a specific example is described herein for the installation of the recessed electrical outlet assembly on an interior wall that has been newly constructed, it should be emphasized that the recessed electrical outlet assembly also could be used on exterior walls or on old work interior walls. For existing interior walls, a hole would be cut in the wall adjacent to a wall stud. Although the captive fasteners shown herein are nails, they could also be screws that would be more easily driven into the wall stud in an old work application.

As shown in FIG. 11, the recessed area 78 in the rear sidewall portion 28 enables the use of electrical fittings or connectors such as the Black Button™ push-in connector 110 for connecting non-metallic cable to electrical boxes, which is available from Arlington Industries of Scranton, Pa. The recessed area 78 permits use of the connectors without projecting from the sidewall and interfering with placement of the electrical box in locations where space is tightly restricted.

The electrical box 22 and frame member 24 portions of the recessed electrical outlet assembly of the present invention may be constructed of metal or plastic. In a preferred embodiment, the electrical box 22 and frame member 24 are each molded in one piece of plastic.

Having thus described the invention with reference to a preferred embodiment, it is to be understood that the invention is not so limited by the description herein but is defined as follows by the appended claims.

What is claimed is:

1. A recessed electrical outlet assembly comprising:
    an electrical box including front sidewalls, said front sidewalls including a front edge, a rear edge, and an outer surface;
    a lateral wall extending inward from said rear edge of said front sidewalls, said lateral wall including a front face;
    rear sidewalls extending rearward from said lateral wall to a rear edge;
    an arrangement for securing an electrical device to said electrical box planar with said front face of said lateral wall;

a frame member including a peripheral sidewall and a lateral flange, said peripheral wall terminating in an open rear end;

a fastening arrangement for securing said frame member to said electrical box: and said fastening arrangement including an aperture in said flange of said frame member, a bore in said front sidewalls of said electrical box; and a fastener for securing through said aperture of said frame member into said bore of said electrical box whereby said flange of said frame member is secured flush against said front edge of said front sidewalls of said electrical box.

2. The recessed electrical outlet assembly of claim 1 including one or more alignment tabs extending along said outer surface of said front sidewalls, said alignment tabs extending rearward from said front edge of said electrical box.

3. The recessed electrical outlet assembly of claim 2 wherein said alignment tabs include a rear edge; and said rear edges of said alignment tabs are planar with said front edge of said electrical box.

4. The recessed electrical outlet assembly of claim 1 including an outer surface on said rear sidewalls; and one or more ribs extending along said outer surface of said rear sidewall, said ribs extending rearward from said lateral wall of said electrical box.

5. The recessed electrical outlet assembly of claim 1 wherein said rear sidewalls include one or more recessed areas therein, said recessed areas including a recessed peripheral wall.

6. The recessed electrical outlet assembly of claim 1 including bosses molded integrally within said electrical box and terminating in a front face, said front face of said bosses planar with said front face of said lateral wall.

7. The recessed electrical outlet assembly of claim 1 including a mounting arrangement for securing said electrical box to a stud.

8. The recessed electrical outlet assembly of claim 7 wherein said mounting arrangement includes one or more fastener retaining bosses on said outer surface of said front sidewalls of said electrical box; and a captive fastener held frictionally within each of said fastener retaining bosses.

9. The recessed electrical outlet assembly of claim 8 wherein said captive fasteners include an axial orientation; and said axial orientation of said captive fasteners is toward said front edge of said electrical box and away from said outer surface of said front sidewall.

10. The recessed electrical outlet assembly of claim 8 includes integral legs offsetting said fastener retaining bosses from said outer surface of said front sidewalls of said electrical box.

11. The recessed electrical outlet assembly of claim 1 wherein said peripheral sidewall of said frame member is of a slightly smaller size than said front sidewalls of said electrical box, said peripheral sidewall of said frame member thereby capable of being telescopically received within said front sidewalls of said electrical box.

12. The recessed electrical outlet assembly of claim 1 wherein said flange extends outward from said peripheral sidewall of said frame member by a distance of at least 0.5 inch.

13. The recessed electrical outlet assembly of claim 9 wherein said captive fasteners are at an angle of between 5 and 15 degrees with respect to said front edge of said electrical box.

14. The recessed electrical outlet assembly of claim 9 wherein said captive fasteners are at an angle of between 5 and 15 degrees with respect to said outer surface of said front sidewall of said electrical box.

15. The recessed electrical outlet assembly of claim 1 including a rear wall extending from said rear edge of said rear sidewalls of said electrical box, said rear wall closing said rear edge of said electrical box and defining a cavity therein.

* * * * *